US010777846B2

(12) United States Patent
Kwon et al.

(10) Patent No.: US 10,777,846 B2
(45) Date of Patent: Sep. 15, 2020

(54) METHOD FOR PREPARING NEEDLE-LIKE SULFIDE-BASED SOLID ELECTROLYTE (71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Oh Min Kwon, Busan (KR); Yong Sub Yoon, Seoul (KR); Sung Woo Noh, Seoul (KR); Seung Hyun Oh, Gyeonggi-do (KR); Sun Ho Choi, Incheon (KR); Dong Wook Shin, Gyeonggi-do (KR); Chan Hwi Park, Seoul (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 280 days.

(21) Appl. No.: 15/845,065

(22) Filed: Dec. 18, 2017

(65) Prior Publication Data
US 2019/0115622 A1    Apr. 18, 2019

(30) Foreign Application Priority Data
Oct. 13, 2017    (KR) .......................... 10-2017-0133337

(51) Int. Cl.
*H01M 10/0562*    (2010.01)
*C01B 17/22*    (2006.01)
(Continued)

(52) U.S. Cl.
CPC ....... *H01M 10/0562* (2013.01); *B01F 3/1214* (2013.01); *C01B 17/22* (2013.01);
(Continued)

(58) Field of Classification Search
CPC ..... H01M 10/0562; C01B 17/22; C01B 17/40
See application file for complete search history.

(56) References Cited

U.S. PATENT DOCUMENTS 9,172,113 B2 * 10/2015 Ohtomo ............ H01M 10/0562
2014/0227610 A1    8/2014 Aburatani et al.
(Continued)

FOREIGN PATENT DOCUMENTS

JP    2012-212652 A    11/2012
JP    2013-016423 A    1/2013
(Continued)

*Primary Examiner* — Jonathan Crepeau
(74) *Attorney, Agent, or Firm* — Mintz Levin Cohn Ferris Glovsky and Popeo, P.C.; Peter F. Corless (57) ABSTRACT Provided is a method for preparing a needle-like sulfide-based solid electrolyte. The method may include: preparing a solid electrolyte admixture comprising an organic solvent, $Li_2S$, $P_2S_5$, and LiCl; synthesizing a solid electrolyte by stirring the solid electrolyte admixture at a temperature of about 30 to 60° C. for about 22 to 26 hours; first stirring the solid electrolyte at a speed of about 80 to 120 rpm for about 5 to 10 minutes; after the first stirring, second stirring the first stirred solid electrolyte at a speed of about 250 to 300 rpm; vacuum-drying the second stirred solid electrolyte for about 12 to 24 hours; and heat-treating the vacuum-dried solid electrolyte at a temperature of about 350 to 550° C. for about 1 to 5 hours.

11 Claims, 11 Drawing Sheets (51) Int. Cl.
*C01B 17/40* (2006.01)
*H01M 10/0525* (2010.01)
*B01F 3/12* (2006.01)

(52) U.S. Cl.
CPC ......... *C01B 17/40* (2013.01); *H01M 10/0525* (2013.01); *B01F 2215/0036* (2013.01); *H01M 2220/20* (2013.01); *H01M 2300/008* (2013.01); *H01M 2300/0068* (2013.01)

(56) References Cited

U.S. PATENT DOCUMENTS

| | | | |
|---|---|---|---|
| 2014/0314098 A1 | 10/2014 | Park et al. | |
| 2017/0214081 A1* | 7/2017 | Tsuno | H01M 4/139 |
| 2018/0062166 A1* | 3/2018 | Sasaki | H01M 10/0525 |
| 2018/0219219 A1* | 8/2018 | Ito | H01M 4/366 |
| 2018/0366777 A1* | 12/2018 | Sasaki | H01M 4/134 |

FOREIGN PATENT DOCUMENTS

| | | |
|---|---|---|
| JP | 5594364 B2 | 9/2014 |
| KR | 2015-0039550 A | 4/2015 |

\* cited by examiner

METHOD FOR PREPARING NEEDLE-LIKE SULFIDE-BASED SOLID ELECTROLYTE

CROSS-REFERENCE TO RELATED APPLICATION

This application claims under 35 U.S.C. § 119(a) the benefit of Korean Patent Application No. 10-2017-0133337 filed Oct. 13, 2017, the entire contents of which are incorporated herein by reference.

TECHNICAL FIELD

The present invention relates to a method of preparing a needle-like sulfide-based solid electrolyte. The method may improve the charge and discharge capacity of an all-solid battery and may reduce a decrease in charge and discharge capacity during the course of charging and discharging.

BACKGROUND

Recently, a method for synthesizing a sulfide-based solid electrolyte by reacting $Li_2S$—$P_2S_5$ in a polar organic solvent has been suggested as a mass-production process for synthesizing a sulfide-based solid electrolyte. However, since the reaction occurs in the solvent, amorphous particles having heterogeneous spherical shape are obtained as the sulfide-based solid electrolyte. The amorphous solid electrolyte has a small specific surface area, so that a contact area between the solid electrolyte and an electrode active material may be reduced in a composite electrode.

In the related arts, a method of mixing two solvents having different solubilities to sulfur compounds of the electrolyte has been disclosed in order to control microparticles, but is not pertinent to a needle-like sulfide-based solid electrolyte. In addition, a method for finely pulverizing particles by using a milling machine and a temperature-retaining reaction vessel has been disclosed, but the size of the reaction device may be substantially increased in that method.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, provided is a method for preparing a needle-like sulfide-based solid electrolyte. The method may manufacture the needle-like sulfide-based solid electrolyte that may improve the charge and discharge capacity and may reduce a decrease in charge and discharge capacity even though the cycle number for the charging and discharging increases.

In one aspect, the present invention provides a method for preparing a needle-like sulfide-based solid electrolyte. The method may include: preparing a solid electrolyte admixture comprising an organic solvent, $Li_2S$, $P_2S_5$, and LiCl; synthesizing a solid electrolyte by stirring the solid electrolyte admixture; first stirring the solid electrolyte at a speed of about 80 to 120 rpm for about 5 to 10 minutes; after the first stirring, second stirring the first stirred solid electrolyte at a speed of about 250 to 300 rpm; vacuum-drying the second stirred solid electrolyte; and heat-treating the vacuum-dried solid electrolyte at 350 to 550° C. for 1 to 5 hours to obtain the needle-like sulfide-based solid electrolyte.

In a preferred embodiment, the organic solvent may include at least one selected from the group consisting of an ethyl ester-based organic solvent, a methyl ester-based organic solvent, a propyl ester-based organic solvent, a butyl ester-based organic solvent, and an amyl ester-based organic solvent. The organic solvent may be ethyl acetate.

The solid electrolyte admixture may suitably include at least one selected from the group consisting of $Li_2SO_4$, $P_2S_3$, $P_2O_5$, and $GeS_2$.

Preferably, the solid electrolyte may suitably be synthesized by stirring the solid electrolyte admixture at a temperature of about 30 to 60° C. for about 22 to 26 hours. The vacuum-drying may suitably be performed for about 12 to 24 hours.

The vacuum-drying of the second stirred solid electrolyte may be suitably carried out at a temperature of about 20 to 60° C.

Preferably, the needle-like sulfide-based solid electrolyte may have a specific surface area of 0.2 to 1.0 $m^2/g$.

Preferably, during the first stirring of the solid electrolyte, adhesion of the $Li_2S$, the $P_2S_5$, and the LiCl may be prevented, and the $Li_2S$, the $P_2S_5$, and the LiCl may be uniformly mixed.

Preferably, during the second stirring of the first stirred solid electrolyte, the organic solvent may react with the $Li_2S$, the $P_2S_5$, and the LiCl.

Also provided herein is an electrolyte prepared by the method as described herein.

Further provided is an all-solid battery that may include the electrolyte as described herein.

Still further provided is a vehicle that may include the all-solid battery as described herein.

Accordingly, charge and discharge capacity of an all-solid battery may be improved and a decrease in charge and discharge capacity may be reduced even though the cycle number of the charging and discharging increases.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above objects, other objects, characteristics, and advantages of the present invention will be easily understood through the following preferred Examples related to the accompanying drawings. However, the present invention is not limited to the Examples described herein, and may be implemented in various different forms. On the contrary, the Examples introduced herein are provided to make the disclosed content thorough and complete, and sufficiently transfer the spirit of the present invention to the person skilled in the art.

In a description of each drawing, like reference numerals are used for like constituent elements. In the accompanying drawings, the dimensions of the structures are illustrated while being enlarged compared with actual dimensions for clarity of the present invention. Terms such as first and second may be used to explain various constituent elements, but the constituent elements are not limited by the terms. The terms are used only to distinguish one constituent element from another constituent element. For example, without departing from the scope of the invention, a first constituent element may be named as a second constituent element, and similarly, the second constituent element may be named as the first constituent element. Singular expressions used herein include plural expressions unless the singular expressions have definitely opposite meanings in the context.

In the present application, it will be appreciated that the term "include" or "have" is intended to designate the existence of characteristics, numbers, steps, operations, constituent elements, and parts described in the specification or a combination thereof, and does not exclude in advance a possibility of the existence or addition of one or more other characteristics, numbers, steps, operations, constituent elements, and components, or a combination thereof. Furthermore, a case where a part such as a layer, a film, a region, and a plate is present "over" another part includes not only a case where the part is present "immediately on" another part, but also a case where still another part is present therebetween. In contrast, a case where a part such as a layer, a film, a region, and a plate is present "beneath" another part includes not only a case where the part is present "immediately below" another part, but also a case where still another part is present therebetween.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
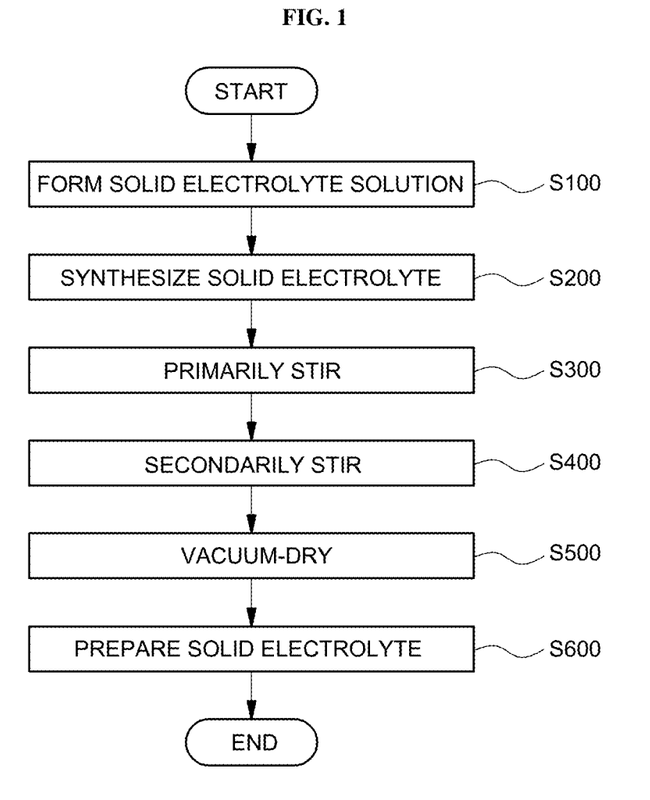
FIG. 1 shows an exemplary method for preparing a needle-like sulfide-based solid electrolyte according to an exemplary embodiment of the present invention.

FIG. 1 is a schematic flowchart of an exemplary method for preparing a needle-like sulfide-based solid electrolyte according to an exemplary embodiment of the present invention.

As shown in FIG. 1, the method may include: preparing a solid electrolyte admixture comprising an ethyl ester-based organic solvent, $Li_2S$, $P_2S_5$, and LiCl (S100); synthesizing a solid electrolyte by stirring the solid electrolyte admixture at a temperature of about 30 to 60° C. for about 22 to 26 hours (S200); first stirring the solid electrolyte at about 80 to 120 rpm for about 5 to 10 minutes (S300); second stirring the first stirred solid electrolyte at a temperature of about 250 to 300 rpm (S400); vacuum-drying the second stirred solid electrolyte for about 12 to 24 hours (S500); and heat-treating the vacuum-dried solid electrolyte at a temperature of about 350 to 550° C. for 1 to 5 hours (S600), thereby obtaining the needle-like sulfide-based solid electrolyte.

In one preferred aspect, the solid electrolyte prepared by the method for preparing a needle-like sulfide-based solid electrolyte according to the exemplary embodiment of the present invention may be used in a battery, for example, an all-solid battery. Preferably, a positive electrode may include a lithium transition metal oxide such as $LiCoO_2$ (LCO) and $Li[Ni,Co,Mn]O_2$ (NCM), and a negative electrode may include lithium-indium (Li—In), graphite, and $Li_4Ti_5O_{12}$ (LTO).

The solid electrolyte admixture may be formed or prepared by mixing an ethyl ester-based organic solvent, $Li_2S$, $P_2S_5$, and LiCl (S100). The organic solvent may mean a solvent including an organic material. The "-based" organic solvent may mean an organic solvent including a/an " . . . group" or a/an " . . . compound". In the forming of the solid electrolyte admixture (S100), the organic solvent may be include at least one selected from the group consisting of an ethyl ester-based organic solvent, a methyl ester-based organic solvent, a propyl ester-based organic solvent, a butyl ester-based organic solvent, and an amyl ester-based organic solvent. $Li_2S$, $P_2S_5$, and LiCl may suitably react with each other to form $Li_6PS_5Cl$.

The solid electrolyte admixture (S100) may further include at least one of $Li_2SO_4$, $P_2S_3$, $P_2O_5$, and $GeS_2$.

A solid electrolyte may be synthesized by stirring the solid electrolyte admixture at a temperature of about 30 to 60° C. for about 22 to 26 hours (S200). When the stirring temperature is less than the predetermined range, e.g., less than about 30° C., or the stirring is performed less than the predetermined time, e.g., less than about 22 hours, reactions may not sufficiently occur, and as a result, the solid electrolyte may not be sufficiently synthesized. In contrary, when the stirring temperature is greater than the predetermined range, e.g., greater than about 60° C., or the stirring is performed greater than the predetermined time, e.g., greater than about 26 hours, reactions may excessively occur, and as a result, the durability of the produced solid electrolyte may be deteriorated.

Next, the solid electrolyte may be first stirred at about 80 to 120 rpm for about 5 to 10 minutes (S300). The first stirring of the solid electrolyte may prevent $Li_2S$, $P_2S_5$, and LiCl from being adhered and uniformly mix $Li_2S$, $P_2S5$, and LiCl, in the solid electrolyte admixture. As such, prevent $Li_2S$, $P_2S_5$, and LiCl in the solid electrolyte may be prevented from being precipitated without participating in reactions. When the first stirring of the solid electrolyte (S300) is carried out at a stirring speed less than predetermined range, e.g., less than about 80 rpm or for a time less than about the predetermined range, e.g., less than about 5 min, at least one of $Li_2S$, $P_2S_5$, and LiCl may be adhered, or $Li_2S$, $P_2S_5$, and LiCl may not be uniformly mixed. In contrast, when the first stirring of the solid electrolyte (S300) is carried out at a stirring speed greater than predetermined range, e.g., greater than about 120 rpm or for a time greater than about the predetermined range, e.g., greater than about 10 min, the mixing efficiency may be reduced.

The first stirred solid electrolyte may be second stirred at about 250 to 300 rpm (S400). The stirring time is not particularly limited, and the solid electrolyte may be stirred until $Li_2S$, $P_2S_5$, and LiCl are completely reacted in the presence of an organic solvent. In the second stirring of the first stirred solid electrolyte, the ethyl ester-based organic solvent may react with $Li_2S$, $P_2S_5$, and LiCl. Preferably, the organic solvent may react with $Li_2S$, $P_2S_5$, and LiCl in the second stirring of the first stirred solid electrolyte, thereby preventing an amorphous sulfide-based solid electrolyte having no particular shape from being produced. When the second stirring of the first stirred solid electrolyte (S400) is carried out at a stirring speed less than predetermined range, e.g., less than about 250 rpm, the reaction degree of the organic solvent with $Li_2S$, $P_2S_5$, and LiCl may be reduced, and when the second stirring of the first stirred solid electrolyte (S400) is carried out at a stirring speed greater than predetermined range, e.g., greater than about 300 rpm, the reaction efficiency may be reduced.

The second stirred solid electrolyte may be vacuum-dried for about 12 to 24 hours (S500). The vacuum-drying of the second stirred solid electrolyte (S500) may be carried out at a temperature of about 20 to 60° C. In the vacuum-drying of the second stirred solid electrolyte (S500), the organic solvent may be evaporated and removed. When the vacuum-drying of the second stirred solid electrolyte (S500) is carried out at a temperature less than predetermined range, e.g., less than about 20° C.m, the organic solvent may not be sufficiently evaporated, and when the vacuum-drying of the second stirred solid electrolyte (S500) is carried out at a temperature greater than predetermined range, e.g., greater than about 60° C., durability of the remaining solid electrolyte may be deteriorated.

A needle-like sulfide-based solid electrolyte may be prepared by heat-treating the vacuum-dried solid electrolyte at a temperature of about 350 to 550° C. for about 1 to 5 hours (S600). Through the heat-treating of the vacuum-dried solid electrolyte (S600), a needle-like sulfide-based solid electrolyte may be prepared. The term "needle-like" may mean approximately a needle shape that has a length greater than a cross section area of across the length direction, for example, the length of the needle shape greater than about 10 times, 20 times, 30 times, 40 times, 50 times, or 100 times greater than the cross section area. The term "sulfide-based" is meant by including a sulfide. The needle-like sulfide-based solid electrolyte may suitably include particles of the solid electrolyte that includes at least the sulfide wherein each particle may have a needle-like shape. When the heat-treating of the vacuum-dried solid electrolyte (S600) is carried out at a temperature less than predetermined range, e.g., less than about 350° C. or for a time less than about the predetermined range, e.g., less than about 1 hour, the needle-like solid electrolyte may not be sufficiently obtained. In contrast, when the heat-treating of the vacuum-dried solid electrolyte (S600) is carried out at a temperature greater than predetermined range, e.g., less than about 550° C. or for a time less than about the predetermined range, e.g., less than about 5 hours, excessive heat may be applied, and as a result, durability may be deteriorated, for example, cracks may occur on the solid electrolyte.

The needle-like sulfide-based solid electrolyte may be formed to have a specific surface area of about 0.2 to 1.0 $m^2/g$ by controlling the preparation method. In addition, when the specific surface area is greater than about 1.0 $m^2/g$, the shape of the sulfide-based solid electrolyte may be a spherical shape instead of a needle-like shape.

The method for preparing a needle-like sulfide-based solid electrolyte according to various exemplary embodiments of the present invention may prepare a needle-like sulfide-based solid electrolyte instead of an amorphous, for example, spherical sulfide-based solid electrolyte. Accordingly, cycle numbers of the charge and discharge capacity of an all-solid battery including the needle-like sulfide-based solid electrolyte may be increased, reduction in a decrease in charge and discharge capacity may be prevented or suppressed even though the charging and discharging proceeds.

EXAMPLES

The following examples illustrate the invention and are not intended to limit the same.

Hereinafter, the present invention will be described in more detail through specific Examples. The following Examples are only an example to help understand the present invention, and the scope of the present invention is not limited thereto.

Examples 1 to 8

A solid electrolyte admixture was formed by mixing ethyl acetate, $Li_2S$, $P_2S_5$, and LiCl. A solid electrolyte was synthesized by stirring the solid electrolyte admixture at a temperature 30 to 60° C. for 24 hours. The solid electrolyte was first stirred at a speed of 100 rpm for 5 to 10 minutes. The first stirred solid electrolyte was second stirred at a speed of 250 to 300 rpm until the solid electrolyte was completely synthesized. The second stirred solid electrolyte was vacuum-dried for 12 to 24 hours. A needle-like sulfide-based solid electrolyte was prepared by heat-treating the vacuum-dried solid electrolyte at a temperature of 350 to 550° C. for 1 to 5 hours.

The electrolyte composition, synthesis temperature, and heat treatment temperature of each of Examples 1 to 8 are shown in the following Table 1.

TABLE 1

| | Electrolyte composition | Synthesis temperature (° C.) | Heat treatment temperature (° C.) |
|---|---|---|---|
| Example 1 | $Li_6PS_5Cl$ | 30 | 550 |
| Example 2 | $Li_6PS_5Cl$ | 40 | 550 |
| Example 3 | $Li_6PS_5Cl$ | 50 | 550 |
| Example 4 | $Li_6PS_5Cl$ | 60 | 550 |
| Example 5 | $Li_6PS_5Cl$ | 40 | 350 |
| Example 6 | $Li_6PS_5Cl$ | 40 | 450 |
| Example 7 | $Li_6PS_5Cl$ | 40 | 550 |
| Example 8 | $Li_6PS_5Cl + Li_4P_2S_6$ | 40 | 650 |

Comparative Example 1

$Li_2S$, $P_2S_5$, and LiCl were mixed and dissolved in ethanol. A sulfide-based solid electrolyte was synthesized in the admixture by stirring the admixture at room temperature for 24 hours. After the reaction, the organic solvent was volatilized through vacuum-drying at room temperature. The sulfide-based solid electrolyte was heat-treated at a temperature of 550° C. for 5 hours.

Comparative Example 2

$Li_2S$, $P_2S_5$, and LiCl were mixed and dissolved in tetrahydrofuran. A sulfide-based solid electrolyte was synthesized in the admixture by stirring the admixture at room temperature for 24 hours. After the reaction, the organic solvent was volatilized through vacuum-drying at room temperature. The sulfide-based solid electrolyte was heat-treated at a temperature of 550° C. for 5 hours.

Test Examples

Figure 2A:
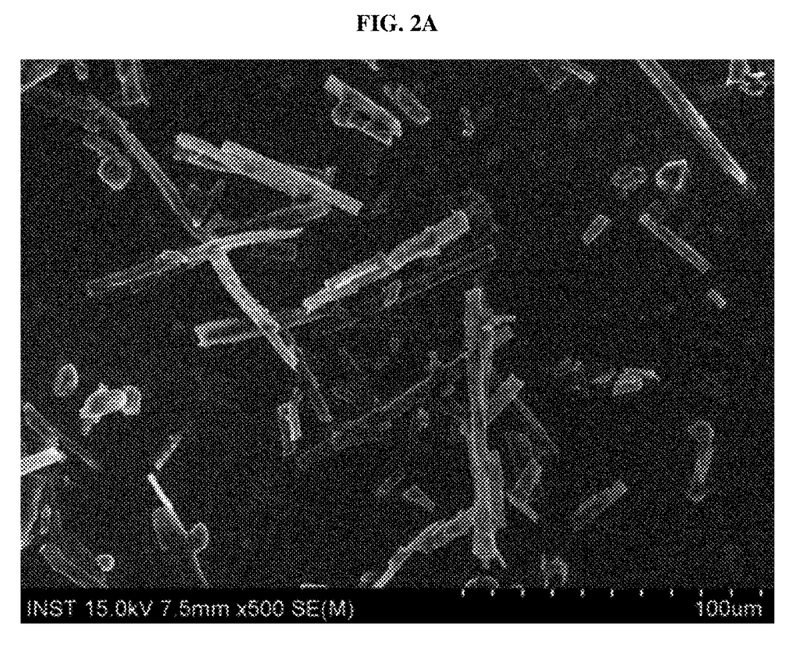
FIGS. 2A, 2B, and 2C are microscopic views of Example 1 before a heat treatment.
Figure 2B:
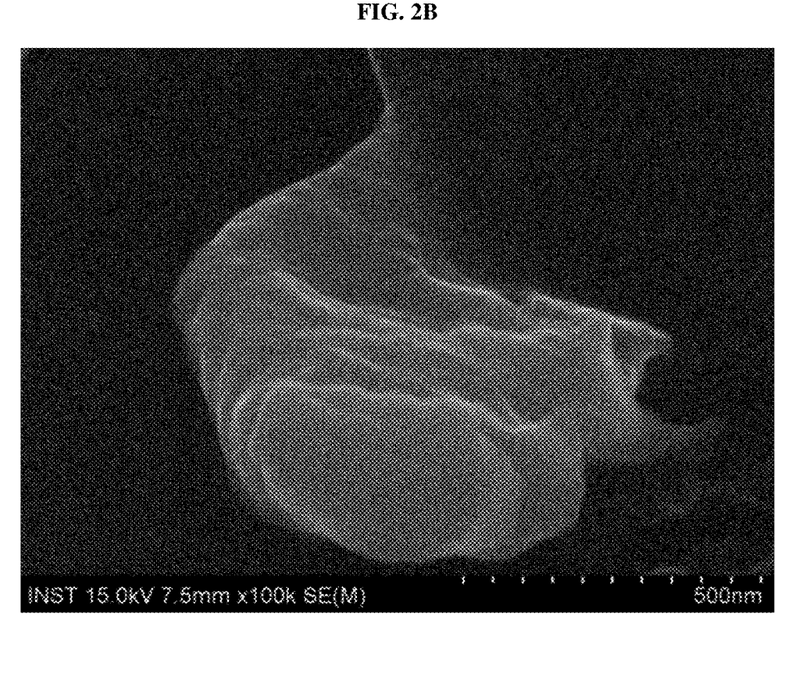
Figure 2C:
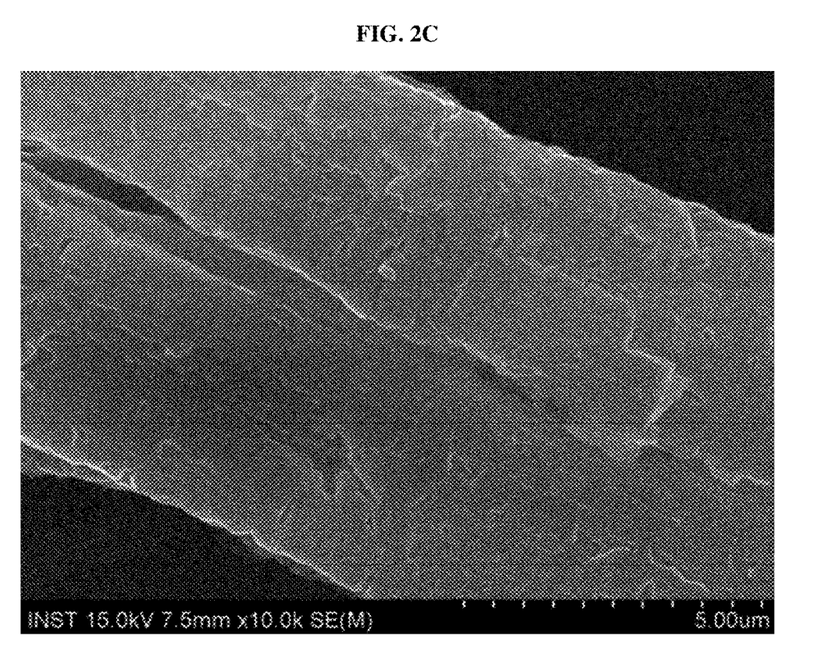
Figure 3A:
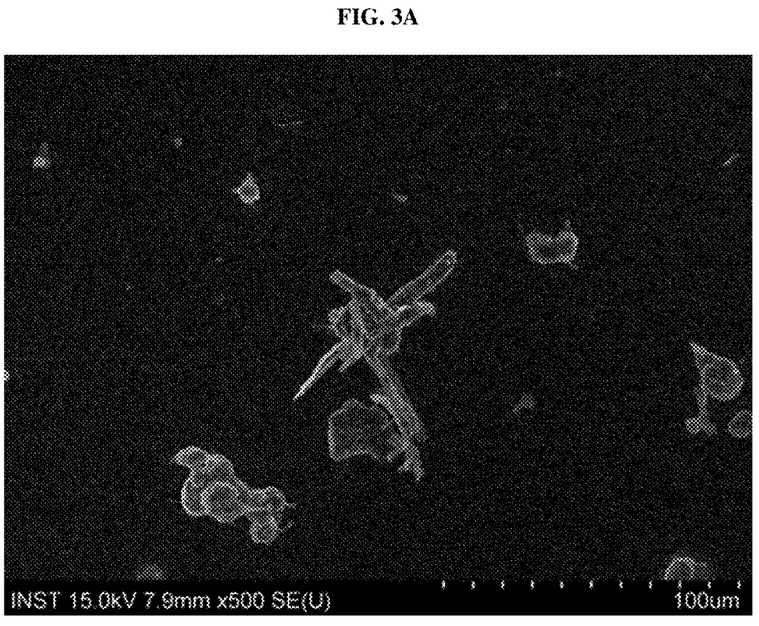
FIGS. 3A, 3B, and 3C are microscopic views of Example 1 after the heat treatment.
Figure 3B:
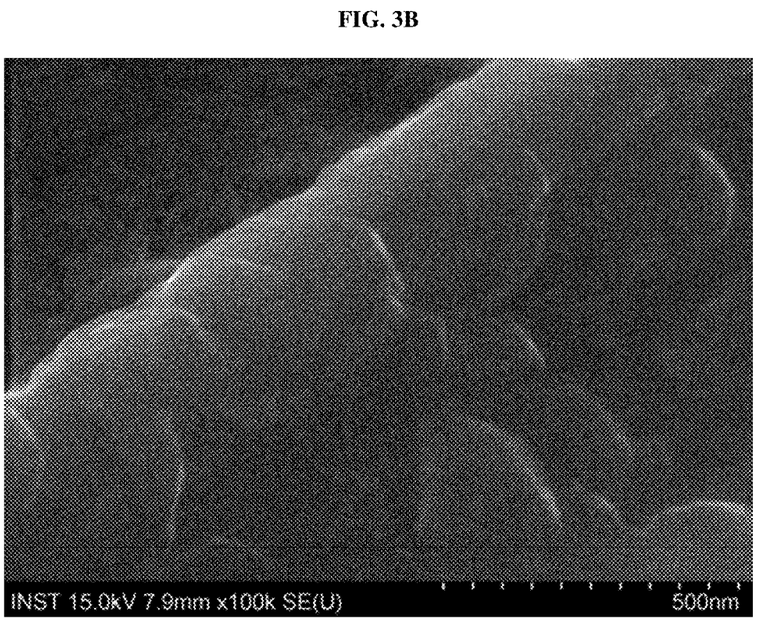
Figure 3C:
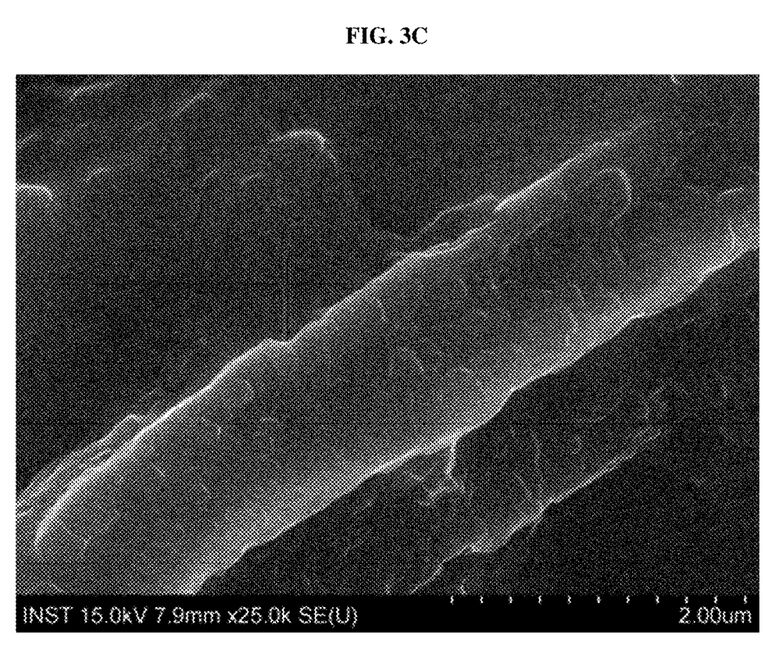
Figure 4A:
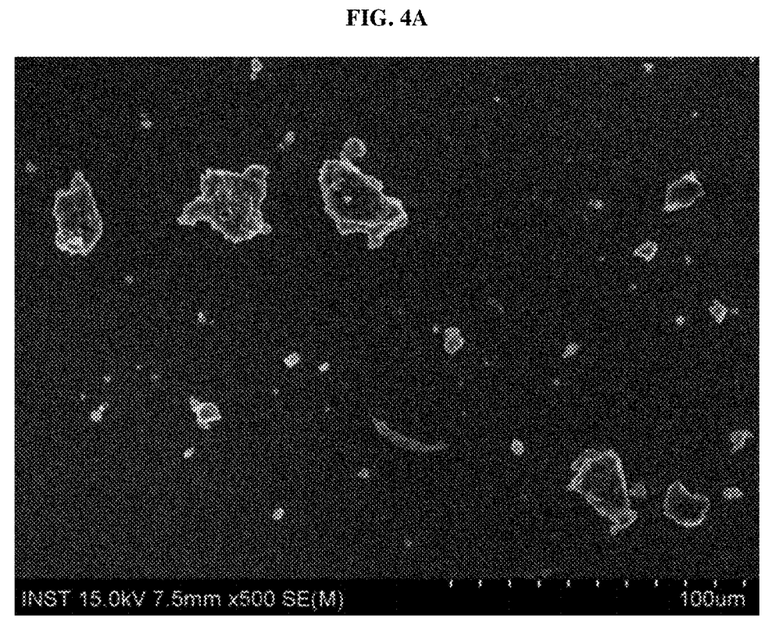
FIGS. 4A, 4B, and 4C are microscopic views of Comparative Example 1 before the heat treatment.
Figure 4B:
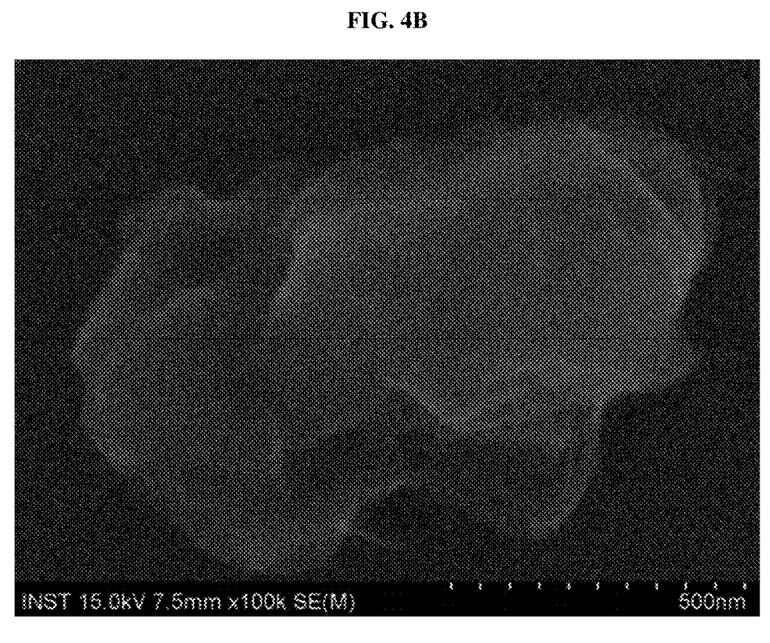
Figure 4C:
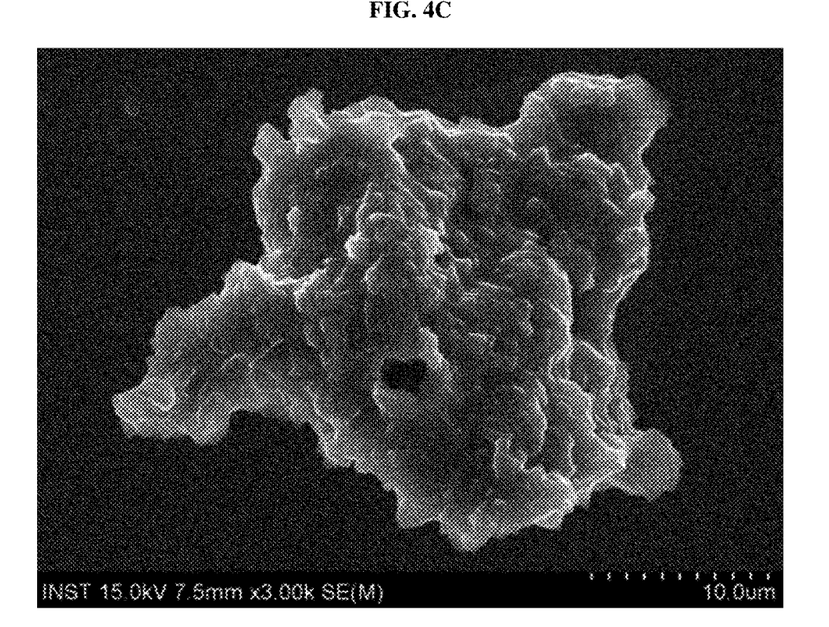
Figure 5A:
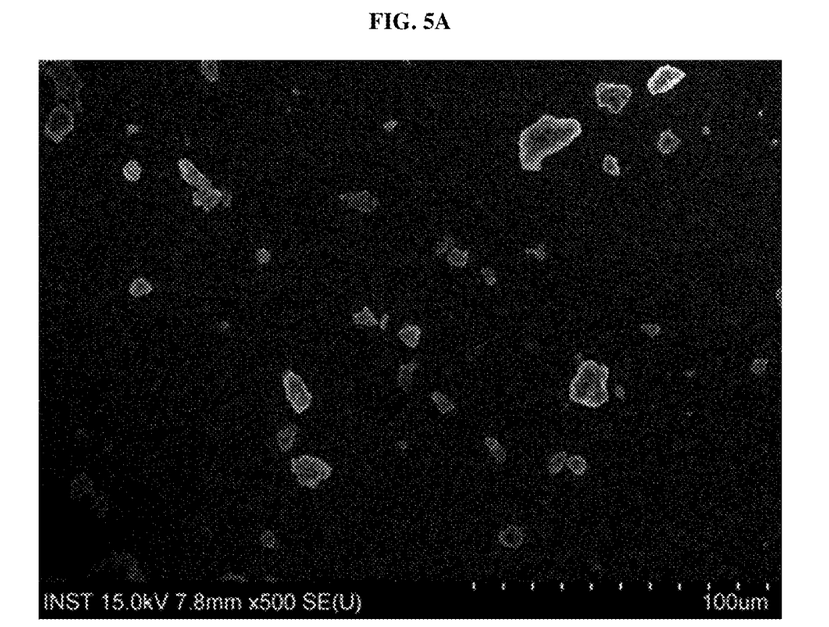
FIGS. 5A, 5B, and 5C are microscopic views of Comparative Example 1 after the heat treatment.
Figure 5B:
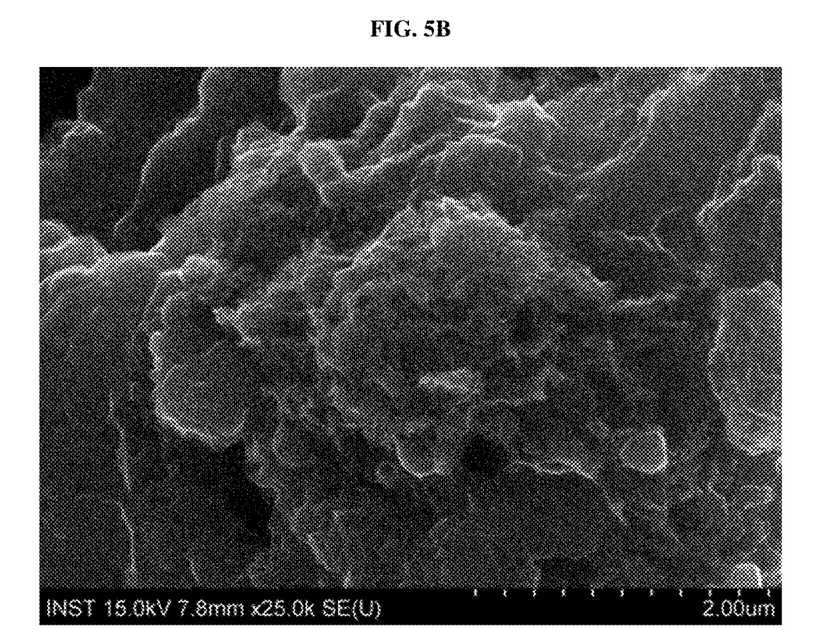
Figure 5C:
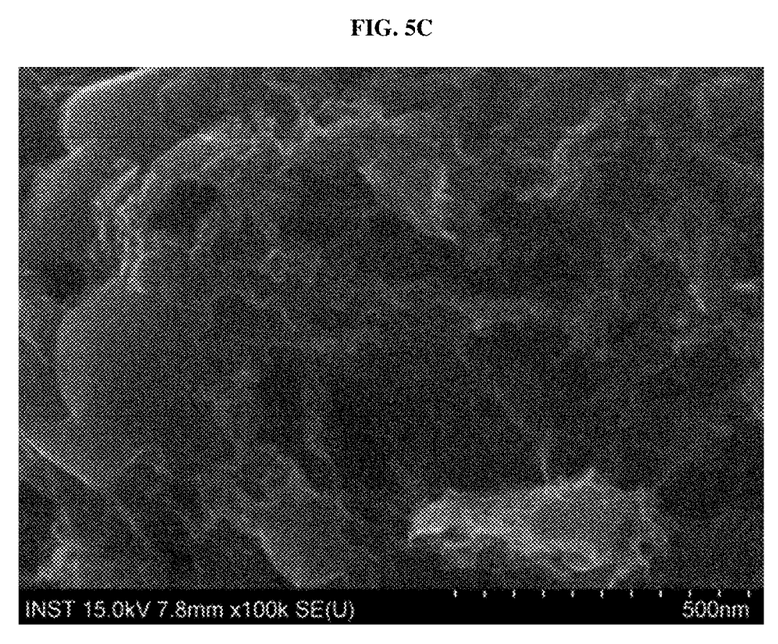

Evaluation of Physical Properties
1. Confirmation of Shape
FIGS. 2A, 2B, and 2C show microscopic photographs of Example 1 before a heat treatment. FIGS. 3A, 3B, and 3C show microscopic photographs of Example 1 after the heat treatment. FIGS. 4A, 4B, and 4C show microscopic photographs of Comparative Example 1 before the heat treatment. FIGS. 5A, 5B, and 5C show microscopic photographs of Comparative Example 1 after the heat treatment.
As shown in FIGS. 2A to 5C, in both Example 1 and Comparative Example 1, foreign materials were removed after the heat treatment, and that Comparative Example 1 had spherical shapes, whereas Example 1 had needle-like shapes.
2. Specific Surface Area

TABLE 2

| | Specific surface area (m$^2$/g) |
|---|---|
| Example 1 | 0.49 |
| Comparative Example 1 | 2.1 |
| Comparative Example 2 | 2.3 |

Figure 6:
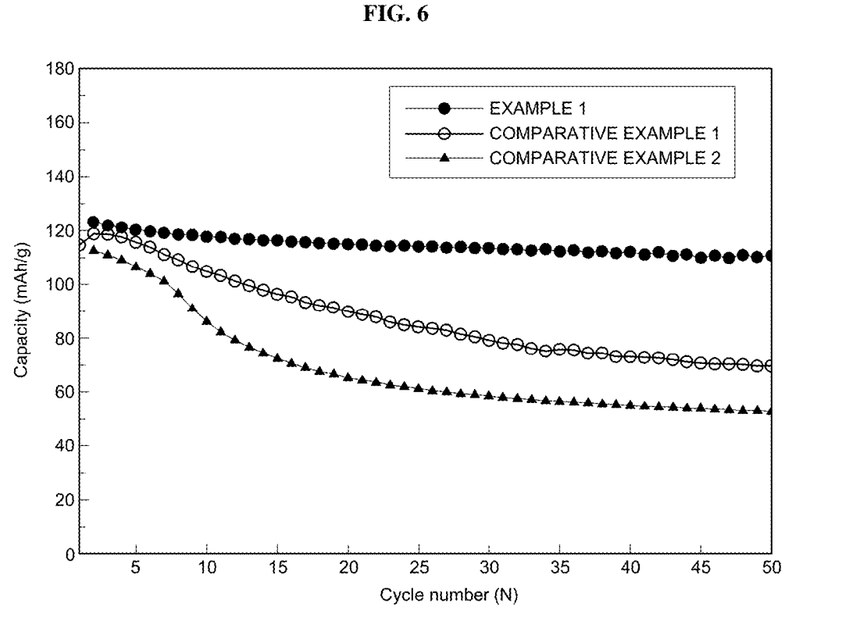
FIG. 6 is a graph obtained by measuring the capacities of Comparative Example 1, Comparative Example 2, and Example 1 according to a number of cycles (charges and discharges)
Figure 7:
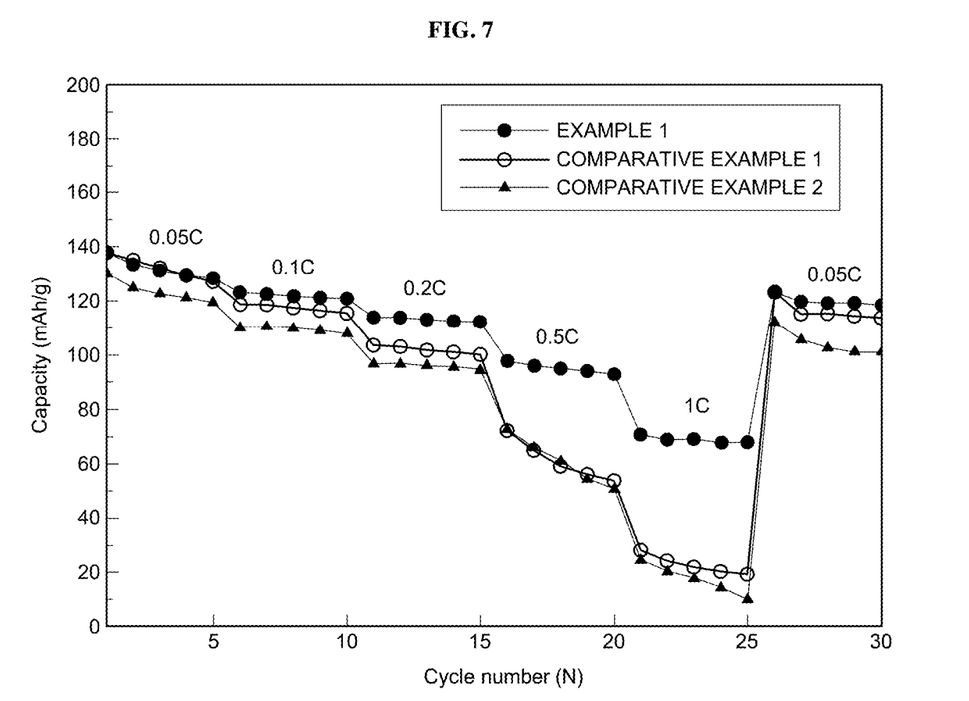
FIG. 7 is a graph obtained by measuring the capacities of Comparative Example 1, Comparative Example 2, and Example 1 according to the number of cycles (charges and discharges).

According to Table 2, Example 1 had a lower specific surface area than Comparative Examples 1 and 2.
3. Evaluation of Cell Performance
In Example 1 and Comparative Examples 1 and 2, solid electrolytes were formed, and Li[Ni,Co,Mn]02(NCM) and lithium-indium (Li—In) were formed as a positive electrode and a negative electrode, respectively, thereby manufacturing an all-solid battery. The capacity of each all-solid battery was measured according to the cycle number of charges and discharges, and is shown in FIGS. 6 and 7.
As shown in FIG. 6, in Example 1, change in capacity was substantially small as the number of charges and discharges was increased.
FIG. 7 illustrates the capacity which was measured when the charging and discharging proceeds while changing the amount of current with respect to the capacity of a cell. During a discharge of 1 C, a battery may be used for 1 hour, and during a discharge of 2 C, the battery may be used for 30 minutes. According to FIG. 7, in Example 1, change in capacity was substantially small as cycle number of the charging and discharging increased while changing the amount of current with respect to the capacity of a cell.
4. Evaluation of Discharge Capacity
Table 3 shows the 50th discharge capacity by performing charging and discharging 50 times in Examples 1 to 8 and Comparative Examples 1 and 2. According to Table 3, Examples 1 to 8 had greater discharge capacities than Comparative Examples 1 and 2.

TABLE 3

| | 50th Discharge Capacity (mAh/g) |
|---|---|
| Example 1 | 115.68 |
| Example 2 | 121.91 |
| Example 3 | 105.65 |
| Example 4 | 100.18 |
| Example 5 | 108.68 |
| Example 6 | 111.47 |
| Example 7 | 121.91 |
| Example 8 | 98.19 |
| Comparative Example 1 | 79.66 |
| Comparative Example 2 | 58.61 |

As shown in FIGS. 2A and 2B, the positive electrode composite layer in Comparative Example 1 was not relatively dense, and had cracks, and the like as compared to that in Example 1. In addition, as shown in Table 1, the energy density of Comparative Example 1 was decreased.

As described above, the Examples of the present invention have been described with reference to the accompanying drawing, but it will be understood by a person with ordinary skill in the art to which the present invention pertains that the present invention can be carried out in other concrete forms without modifying the technical spirit or essential features of the present invention. Therefore, it should be understood that the Examples described above are not limited but illustrative in all respects.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:
1. A method for preparing a needle-like sulfide-based solid electrolyte, comprising:
preparing a solid electrolyte admixture comprising an organic solvent, $Li_2S$, $P_2S_5$, and LiCl;

synthesizing a solid electrolyte by stirring the solid electrolyte admixture at a temperature of about 30 to 60° C. for about 22 to 26 hours;

first stirring the solid electrolyte at a speed of about 80 to 120 rpm for about 5 to 10 minutes;

after the first stirring, second stirring the first stirred solid electrolyte at a speed of about 250 to 300 rpm;

vacuum-drying the second stirred solid electrolyte for about 12 to 24 hours; and heat-treating the vacuum-dried solid electrolyte at a temperature of 350 to 550° C. for about 1 to 5 hours to obtain the needle-like sulfide-based solid electrolyte.

2. The method of claim 1, wherein the organic solvent comprises at least one selected from the group consisting of an ethyl ester-based organic solvent, a methyl ester-based organic solvent, a propyl ester-based organic solvent, a butyl ester-based organic solvent, and an amyl ester-based organic solvent.

3. The method of claim 1, the organic solvent is ethyl acetate.

4. The method of claim 1, wherein the solid electrolyte admixture further comprises at least one selected from the group consisting of $Li_2SO_4$, $P_2S_3$, $P_2O_5$, and $GeS_2$.

5. The method of claim 1, wherein the solid electrolyte is synthesized by stirring the solid electrolyte admixture at a temperature of about 30 to 60° C. for about 22 to 26 hours.

6. The method of claim 1, wherein the vacuum-drying is performed for about 12 to 24 hours.

7. The method of claim 1, wherein the heat-treating is performed at a temperature of 350 to 550° C. for about 1 to 5 hours.

8. The method of claim 1, wherein the vacuum-drying of the second stirred solid electrolyte is carried out at a temperature of about 20 to 60° C.

9. The method of claim 1, wherein the needle-like sulfide-based solid electrolyte has a specific surface area of about 0.2 to 1.0 $m^2/g$.

10. The method of claim 1, wherein, during the first stirring of the solid electrolyte, adhesion of the $Li_2S$, the $P_2S_5$, and the LiCl is prevented, and the $Li_2S$, the $P_2S_5$, and the LiCl is uniformly mixed.

11. The method of claim 1, wherein, during the second stirring of the first stirred solid electrolyte, the organic solvent reacts with the $Li_2S$, the $P_2S_5$, and the LiCl.

* * * * *